W. H. WHEELER.
FOOD TONGS.
APPLICATION FILED MAR. 8, 1911.
999,614.
Patented Aug. 1, 1911.
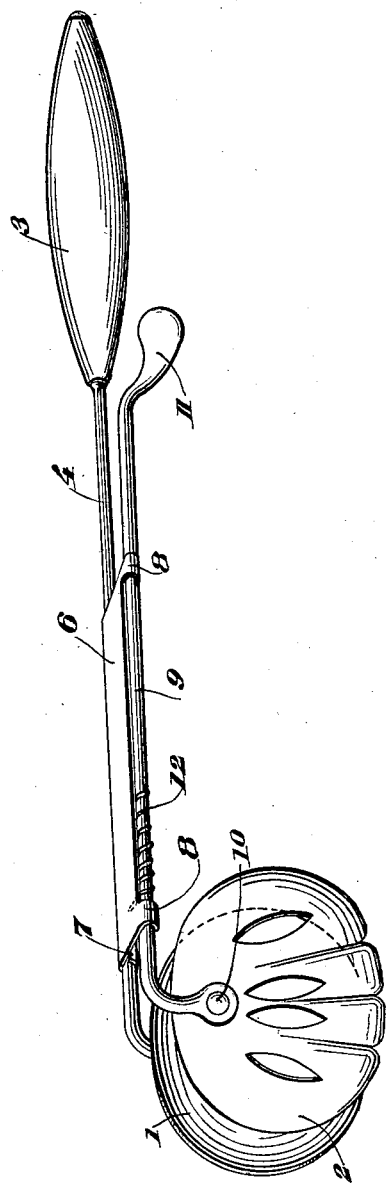
William H. Wheeler, Inventor
Witnesses
A.W. Gardes.
By Victor J. Evans
Attorney

UNITED STATES PATENT OFFICE.

WILLIAM H. WHEELER, OF ENNIS, TEXAS.

FOOD-TONGS.

999,614.　　　　　Specification of Letters Patent.　　Patented Aug. 1, 1911.

Application filed March 8, 1911. Serial No. 613,004.

*To all whom it may concern:*

Be it known that I, WILLIAM H. WHEELER, a citizen of the United States, residing at Ennis, in the county of Ellis and State of Texas, have invented new and useful Improvements in Food-Tongs, of which the following is a specification.

This invention relates to food tongs, the object of the invention being to provide a device designed principally for use in transferring food stuffs, such as cereals of flake form, from a container to a serving dish.

In the drawing, the figure represents a perspective view of my improved tongs.

My improved tongs preferably include substantially identically formed jaws or scoops 1 and 2, each being of concavo-convex form. The concavities of the said jaws or scoops are arranged in opposing relation with respect to each other so as to present a relatively broad or large collecting area in which the material or food stuffs to be handled may be placed. A suitable handle 3 is provided for the jaw or scoop 1, and as shown, the handle is connected with the scoop by a relatively long shank 4.

A supporting member 6 is secured upon the shank 4 and it is preferably constructed from thin sheet material formed on one edge to provide alining tongues or ears 7 which are securely fastened to the shank 4, the opposite edge of the support is formed to provide similar alining ears 8. These ears provide bearings for a rotatably mounted shank or rod 9. The forward end of the shank or rod 9 extends downwardly and it is secured to the scoop or jaw 2, as at 10. The opposite end of the shank or rod is provided with a controlling lever 11 which is located with respect to the handle 3 so that when the handle is grasped by the hand of the operator the thumb of the hand may be engaged with the lever 11 to move the same toward the handle so as to move the jaws or scoops 1 and 2 relatively. The jaws or scoops are normally held open by means of a spring 12. One end of the spring is suitably secured to the rod or shank 9 and the opposite end of the spring is suitably secured to the support 6.

From the construction described it will be seen that the tool as designed is extremely useful in that exact quantities of the cereals to be served may be collected and held by the jaws or scoops during the operation of transferring the cereals from the package or container to the serving dish.

I claim:—

A device of the class described comprising a supporting member, a shank fixedly mounted on the supporting member, a second shank rotatably mounted on the supporting member, a handle at one end of the first shank, a jaw at the opposite end of the first shank, a lever at one end of the second shank, the said lever being arranged immediately at one side of the said handle, a jaw at the opposite end of the second shank and disposed immediately opposite the first jaw, and a spring having one end fixed to the second shank and having its opposite end secured to a fixed support so that under tension of the spring the jaws will be normally held open.

In testimony whereof I affix my signature in presence of two witnesses.

WILLIAM H. WHEELER.

Witnesses:
　BRIGGS RIOYER,
　JOHN T. CLARK.

Copies of this patent may be obtained for five cents each, by addressing the "Commissioner of Patents, Washington, D. C."